United States Patent
Komori et al.

(10) Patent No.: US 10,753,912 B2
(45) Date of Patent: Aug. 25, 2020

(54) GAS CHROMATOGRAPH

(71) Applicant: Shimadzu Corporation, Kyoto (JP)

(72) Inventors: Yuki Komori, Kyoto (JP); Ryo Takechi, Kyoto (JP)

(73) Assignee: Shimadzu Corporation, Kyoto (JP)

(*) Notice: Subject to any disclaimer, the term of this patent is extended or adjusted under 35 U.S.C. 154(b) by 201 days.

(21) Appl. No.: 16/032,258

(22) Filed: Jul. 11, 2018

(65) Prior Publication Data

US 2020/0018732 A1  Jan. 16, 2020

(51) Int. Cl.
G01N 30/30 (2006.01)
G01N 30/06 (2006.01)
G01N 30/18 (2006.01)
G01N 30/54 (2006.01)
G01N 30/02 (2006.01)

(52) U.S. Cl.
CPC ............ *G01N 30/30* (2013.01); *G01N 30/06* (2013.01); *G01N 30/18* (2013.01); *G01N 30/54* (2013.01); *G01N 2030/025* (2013.01); *G01N 2030/3007* (2013.01); *G01N 2030/3046* (2013.01)

(58) Field of Classification Search
None
See application file for complete search history.

(56) References Cited

U.S. PATENT DOCUMENTS

| | | | | |
|---|---|---|---|---|
| 3,043,127 A * | 7/1962 | De Ford | ............... | G01N 30/30 73/23.26 |
| 3,062,038 A * | 11/1962 | Ayers | ..................... | G01N 30/30 73/23.26 |
| 3,146,616 A * | 9/1964 | Loyd | ..................... | G01N 30/30 73/23.26 |
| 3,168,823 A * | 2/1965 | Reinecke | ............. | G01N 30/461 73/23.26 |
| 3,581,465 A * | 6/1971 | Haruki | .................... | F24H 1/142 95/87 |
| 5,390,529 A * | 2/1995 | Ghiselli | ............... | G01N 33/241 73/23.41 |

FOREIGN PATENT DOCUMENTS

| | | | |
|---|---|---|---|
| JP | 3142790 U | 6/2008 | |
| JP | 5120303 B2 | 1/2013 | |
| JP | 2017-125808 | * 7/2017 | ............. G01N 30/30 |

OTHER PUBLICATIONS

Japanese Office Action dated Jan. 22, 2019, in connection with corresponding JP Application No. 2016-006234 (6 pgs., including machine-generated English translation).

* cited by examiner

Primary Examiner — Daniel S Larkin
(74) Attorney, Agent, or Firm — Maier & Maier, PLLC

(57) ABSTRACT

A gas chromatograph includes a sample introduction portion and a heater block. A contact portion is fit into a first recess of a main body of the sample introduction portion. The heater block is fixed to and positioned with respect to the main body of the sample introduction portion by directly coming into contact with the contact portion provided on the main body of the sample introduction portion. For this reason, the heater block may be securely positioned with respect to the sample introduction portion.

3 Claims, 4 Drawing Sheets

GAS CHROMATOGRAPH

FIELD

The present invention relates to a gas chromatograph including a sample introduction portion and a heater block that heats the sample introduction portion.

BACKGROUND

Conventionally, a gas chromatograph including a sample introduction portion and a heater block that heats the sample introduction portion from the outside has been known (for example, see Patent Literature 1 below). In the gas chromatograph, a sample is introduced into the sample introduction portion, and the sample introduction portion is heated by the heater block. Further, the sample in the sample introduction portion is vaporized. The vaporized sample is introduced into a column and then detected by a detector.

FIG. 4 is a side sectional view illustrating a sample introduction portion 100 and a heater block 200 provided in such a conventional gas chromatograph. The sample introduction portion 100 includes a hollow main body 101 and a septum 102 attached to one end portion (upper end portion) of the main body 101. An internal space of the main body 101 is formed as a sample vaporization chamber 103 for vaporizing the sample.

The heater block 200 includes a main body 201 and a pin 202. The main body 201 is formed in a cylindrical shape, and an internal space thereof is formed as an insertion space 203. Further, the main body 201 holds a heater 301. The pin 202 is provided at an upper end portion of the main body 201 and protrudes toward the outside of the main body 201.

In the gas chromatograph, the sample introduction portion 100 and the heater block 200 are fixed as below. First, the main body 101 of the sample introduction portion 100 is inserted into the insertion space 203 of the main body 201 of the heater block 200, and the main body 101 of the sample introduction portion 100 is fixed to a top plate 303. The top plate 303 is a member whose position is fixed in the gas chromatograph.

Then, when a nut 302 provided at the other end portion (lower end portion) of the main body 101 of the sample introduction portion 100 is tightened, the nut 302 moves to the upper end portion side of the main body 101. Further, the main body 201 of the heater block 200 is pushed up by the nut 302, and the pin 202 provided at the upper end portion of the main body 201 abuts on the top plate 303. As a result, a position of the heater block 200 is fixed.

In this state, the sample introduction portion 100 (the sample vaporization chamber 103) is heated by the heater 301 through the heater block 200.

[Patent Literature 1] JP 5-120303.

SUMMARY

In the conventional gas chromatograph described above, since the heater block 200 is fixed by the pin 202 being pressed against the top plate 303, a part of heat from the heater 301 is transferred to the top plate 303 through the pin 202. For this reason, there is a drawback that a part of heat for heating the sample introduction portion 100 is lost via the pin 202. In particular, when a temperature of the top plate 303 is low, for example, when an air temperature is low, there is a problem that not only the amount of heat to be lost increases but also a temperature distribution inside the vaporization chamber changes. In addition, the heater block 200 is indirectly positioned with respect to the sample introduction portion 100 by the pin 202 being in contact with the top plate 303. For this reason, depending on the state of contact of the pin 202 with the top plate 303, the position of the heater block 200 with respect to the sample introduction portion 100 may be shifted.

The invention has been made in view of the above circumstances, and an object thereof is to provide a gas chromatograph capable of efficiently heating a sample introduction portion and securely positioning a heater block with respect to the sample introduction portion.

Solution to Problem (1) A gas chromatograph according to the invention includes a sample introduction portion, a heater block, and a positioning mechanism. A sample vaporization chamber for vaporizing a sample is formed in the sample introduction portion. The heater block heats the sample introduction portion from an outside. The positioning mechanism positions the heater block with respect to the sample introduction portion by bringing the heater block into contact with a contact portion provided on the sample introduction portion.

According to such a configuration, the heater block is positioned with respect to the sample introduction portion by being directly brought into contact with the contact portion of the sample introduction portion by the positioning mechanism.

For this reason, the heater block may be securely positioned with respect to the sample introduction portion.

In addition, the heater block may be positioned without providing a member such that heat from the heater block is transferred to the outside and lost.

For this reason, it is possible to transfer heat from the heater block to the sample introduction portion without loss and efficiently heat the sample introduction portion.

(2) In addition, the heater block may be a tubular member. The sample introduction portion may be inserted into the heater block along an axial direction. The positioning mechanism may position the heater block with respect to the sample introduction portion while interposing both end portions of the heater block in the axial direction.

According to such a configuration, it is possible to securely keep a position of the heater block positioned with respect to the sample introduction portion at a fixed position.

(3) In addition, the positioning mechanism may be allowed to change a relative position of positioning of the heater block with respect to the sample introduction portion.

According to such a configuration, a heated position of the sample introduction portion by the heater block may be changed.

For this reason, depending on the content of analysis in the gas chromatograph, it is possible to adjust a heated part of the sample introduction portion. For example, in a case in which the split flow path is continuous to the sample introduction portion, it is possible to suppress occurrence of carry-over in which a sample at previous analysis is collected in the split flow path by changing the heated position such that a periphery of a continuous part is heated. In addition, for example, when the heated position is changed to suppress heating around a sample inlet in the sample introduction portion, it is possible to suppress vaporization of the sample while the sample is injected into the sample introduction portion, and to carry out analysis having high reproducibility.

(4) In addition, the contact portion may be attachable to and detachable from a plurality of mounting positions. The positioning mechanism may be allowed to change the relative position of positioning of the heater block with respect to the sample introduction portion by bringing the heater block into contact with the contact portion attached to any one of the plurality of mounting positions.

According to such a configuration, it is possible to change the relative position of positioning of the heater block with respect to the sample introduction portion by a simple operation of merely changing the mounting position of the contact portion.

Advantageous Effects of the Invention

According to the invention, the heater block is positioned with respect to the sample introduction portion by directly coming into contact with the contact portion of the sample introduction portion. For this reason, heat from the heater block can be transmitted to the sample introduction portion without being lost, and the sample introduction portion can be efficiently heated. Further, the heater block can be reliably positioned with respect to the sample introduction portion.

DETAILED DESCRIPTION

1. Overall Configuration of Gas Chromatograph

Figure 1:
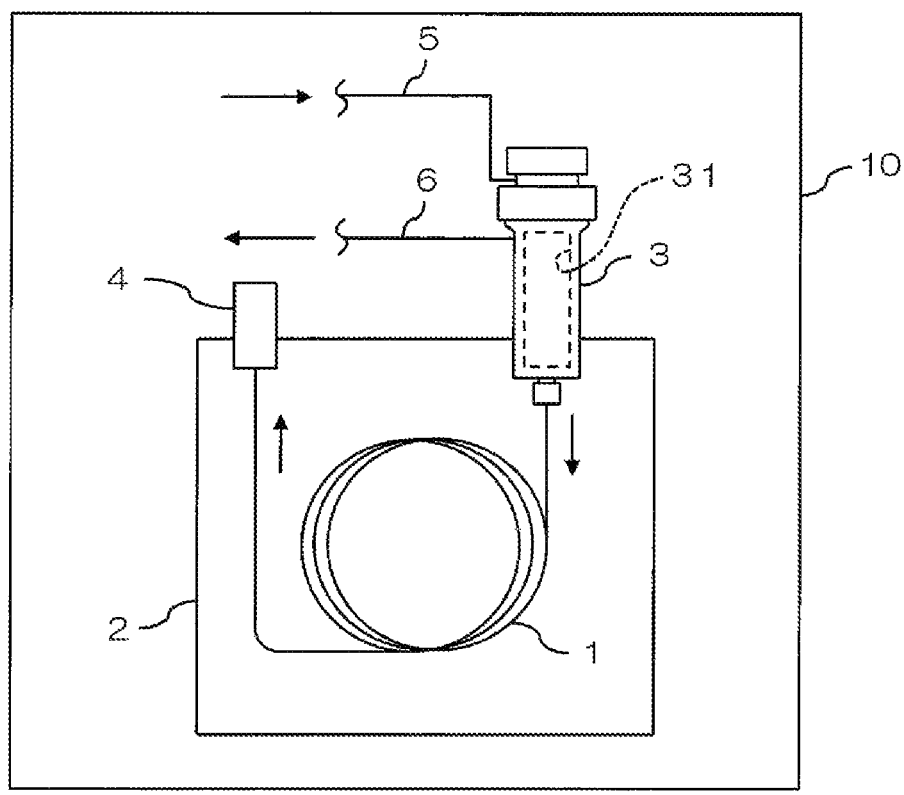
FIG. 1 is a schematic diagram illustrating a configuration example of a gas chromatograph according to an embodiment of the invention.

FIG. 1 is a schematic diagram illustrating a configuration example of a gas chromatograph according to an embodiment of the invention. This gas chromatograph is used for analysis by supplying a sample gas together with a carrier gas into a column 1, and includes a column oven 2, a sample introduction portion 3, a detector 4, and a hollow main body 10 accommodating these components in addition to the column 1.

For example, the column 1 includes a capillary column. The column 1 is accommodated in the column oven 2 together with a heater, a fan, etc. (none of which are illustrated).

The column oven 2 is for heating the column 1, and appropriately drives the heater and the fan at the time of analysis.

The sample introduction portion 3 is for introducing the carrier gas and the sample gas into the column 1, and a sample vaporization chamber 31 is formed therein. A liquid sample is injected into the sample vaporization chamber 31, and a sample vaporized in the sample vaporization chamber 31 is introduced into the column 1 together with the carrier gas. In addition, a gas supply flow path 5 and a split flow path 6 communicate with the sample vaporization chamber 31.

The gas supply flow path 5 is a flow path for supplying the carrier gas into the sample vaporization chamber 31 of the sample introduction portion 3.

The split flow path 6 is a flow path for discharging a part of gas (mixture gas of the carrier gas and the sample gas) in the sample vaporization chamber 31 to the outside at a predetermined split ratio when the carrier gas and the sample gas are introduced into the column 1 by a split introduction method.

For example, the detector 4 includes a hydrogen flame ionization detector (FID). The detector 4 successively detects respective sample components contained in the carrier gas introduced from the column 1.

When a sample is measured in this gas chromatograph, a sample to be analyzed is injected into the sample introduction portion 3. The sample is vaporized in the sample vaporization chamber 31. In addition, the carrier gas is supplied to the sample vaporization chamber 31 of the sample introduction portion 3 through the gas supply flow path 5.

The sample vaporized in the sample vaporization chamber 31 is introduced into the column 1 together with the carrier gas. Respective sample components contained in the sample are separated in a process of passing through the column 1 and successively introduced into the detector 4.

Then, the respective sample components contained in the carrier gas introduced from the column 1 are successively detected in the detector 4. In addition, a chromatogram is generated based on a detection result of the detector 4.

2. Specific Configuration of Sample Introduction Portion and Heater Block

Figure 2:
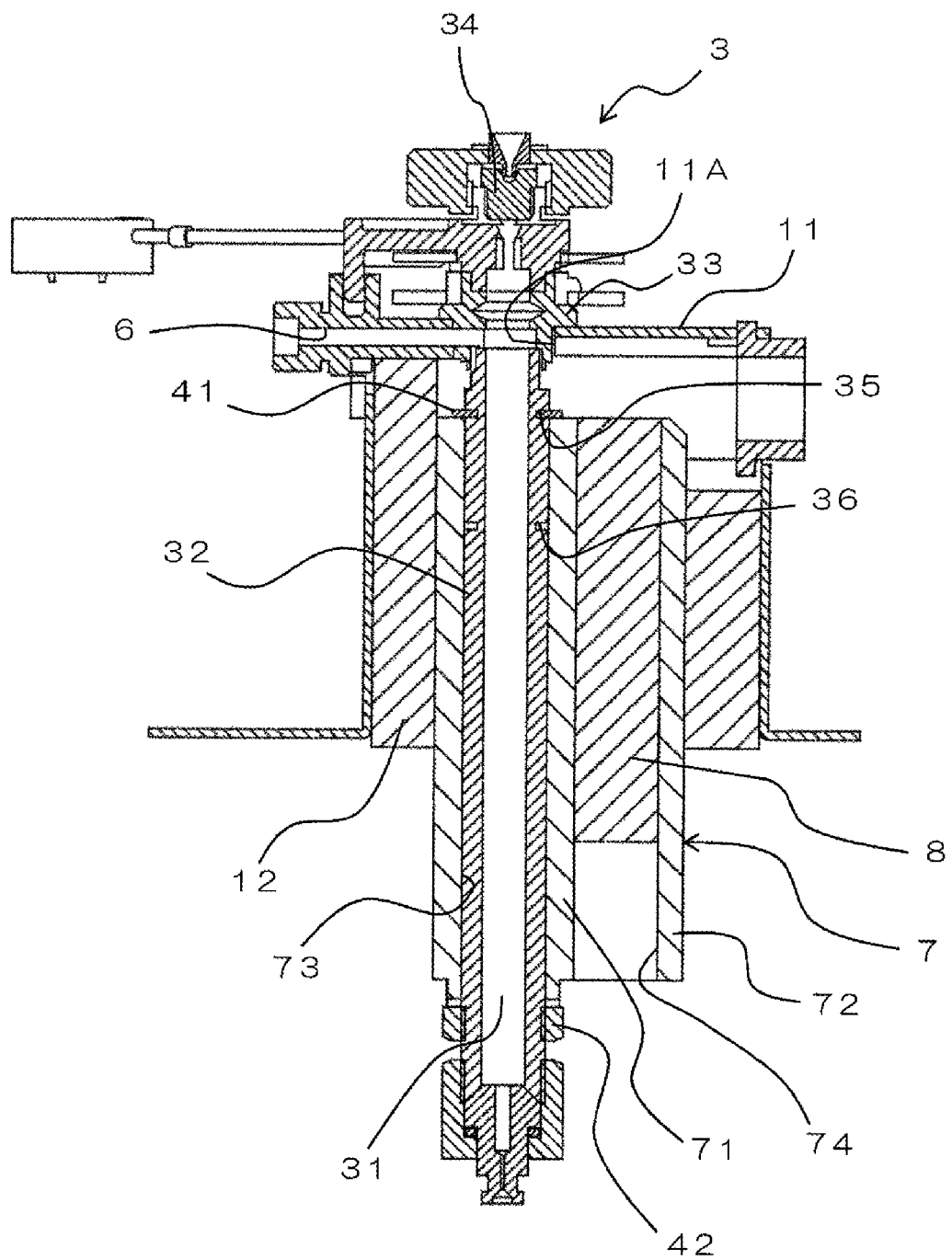
FIG. 2 is a side sectional view illustrating a sample introduction portion and a heater block of the gas chromatograph of FIG. 1, and illustrates a state in which the heater block is located at a first mounting position.

FIG. 2 is a side sectional view illustrating the sample introduction portion 3 and a heater block 7 of the gas chromatograph of FIG. 1, and illustrates a state in which the heater block 7 is located at a first mounting position.

The sample introduction portion 3 includes a main body 32, a mounting portion 33, and a septum 34.

The main body 32 is formed in an elongated hollow cylindrical shape. In an axial direction of the main body 32, a first recess 35 and a second recess 36 are formed at one end portion (upper end portion) of the main body 32, and a screw thread (not illustrated) for attaching a nut 42 described below is formed at the other end portion (lower end portion). An internal space of the main body 32 is formed as the sample vaporization chamber 31 described above.

The first recess 35 is formed on a peripheral surface of the upper end portion of the main body 32. The first recess 35 is an annular groove recessed radially inward from the peripheral surface of the main body 32.

The second recess 36 is formed on the peripheral surface of the upper end portion of the main body 32, and the peripheral surface is on the lower end portion side of the first recess 35. The second recess 36 is an annular groove recessed radially inward from the peripheral surface of the main body 32. A shape of the second recess 36 is the same as a shape of the first recess 35.

The mounting portion 33 is attached to an end surface of the upper end portion of the main body 32. The mounting portion 33 is formed in an annular shape.

The septum 34 is configured to be attachable to an end surface of the mounting portion 33, and the end surface is on an opposite side from a side at which the main body 32 is located. As will be described below, the septum 34 is attached to the mounting portion 33 in a state in which the sample introduction portion 3 is fixed. The septum 34 is, for example, a member made of rubber or silicon.

In a fixed state, the heater block 7 is disposed outside the sample introduction portion 3 to cover the main body 32 of the sample introduction portion 3. The heater block 7 includes a main body 71 and a holding portion 72.

The main body 71 is formed in an elongated tubular shape. An inner diameter of the main body 71 is slightly larger than an outer diameter of the main body 32 of the sample introduction portion 3. A dimension of the main body 71 in a longitudinal direction (axial direction) is smaller than a dimension of the main body 32 of the sample introduction portion 3 in a longitudinal direction (axial direction). An internal space of the main body 71 is formed as an insertion space 73.

The holding portion 72 is formed integrally with the main body 71 and protrudes radially outward from a peripheral surface of the main body 71. The holding portion 72 is formed in an elongated shape extending along the axial direction of the main body 71. A holding space 74 penetrating the holding portion 72 in the longitudinal direction (axial direction of the main body 71) is formed in the holding portion 72. A heater 8 is disposed in the holding space 74.

3. Fixing of Sample Introduction Portion and Heater Block (1) Member Fixed to Main Body A top plate 11 and an insertion portion 12 are disposed inside the main body 10 (see FIG. 1).

The top plate 11 is a plate-like member extending in the horizontal direction, and is attached to the main body 10. A mounting hole 11A penetrating the top plate 11 in a vertical direction is formed in the top plate 11. The split flow path 6 described above is formed in the top plate 11.

The insertion portion 12 is attached below the top plate 11. That is, the insertion portion 12 is fixed in the main body 10 together with the top plate 11. The insertion portion 12 is made of, for example, a heat insulating material and is formed in a tubular shape extending in the vertical direction. When viewed in the vertical direction, an internal space of the insertion portion 12 and the mounting hole 11A of the top plate 11 overlap each other.

(2) Fixing of Heater Block to Sample Introduction Portion

In addition, a contact portion 41 and a nut 42 are used when the sample introduction portion 3 and the heater block 7 are fixed.

The contact portion 41 is attached to the upper end portion of the main body 32 of the sample introduction portion 3 as described below. For example, the contact portion 41 is an E-ring curved in an E-shape in a horizontal plane. A vertical thickness of the contact portion 41 is the same as a vertical width of each of the first recess 35 and the second recess 36. In addition, a horizontal width of the contact portion 41 is larger than a horizontal depth of each of the first recess 35 and the second recess 36. In addition, an inner diameter of the contact portion 41 is smaller than the outer diameter of the main body 32 of the sample introduction portion 3.

As described below, the nut 42 is attached to a lower end portion of the main body 32 of the sample introduction portion 3.

The contact portion 41 and the nut 42 are included in a positioning mechanism for positioning the heater block 7 with respect to the sample introduction portion 3.

Further, the sample introduction portion 3 and the heater block 7 are fixed as below.

First, the contact portion 41 is attached to either the first recess 35 or the second recess 36 of the main body 32 of the sample introduction portion 3. Here, a case where the contact portion 41 is attached to the first recess 35 will be described.

Specifically, the contact portion 41 is fixed to the main body 32 of the sample introduction portion 3 by being fit into the first recess 35. In this state, an inner edge of the contact portion 41 enters the first recess 35, and an outer edge of the contact portion 41 protrudes radially outward from the outer peripheral surface of the main body 32 of the sample introduction portion 3.

Further, the main body 32 of the sample introduction portion 3 is inserted into the insertion space 73 of the main body 71 of the heater block 7. Specifically, first, the main body 32 of the sample introduction portion 3 is inserted into the insertion space 73 of the main body 71 of the heater block 7 from the lower end portion side.

Subsequently, the nut 42 is attached to the lower end portion of the main body 32 of the sample introduction portion 3. Then, when the nut 42 is tightened, the nut 42 moves to the upper end portion side of the main body 32 of the sample introduction portion 3 and comes into contact with a lower end surface of the main body 71 of the heater block 7. Further, when the nut 42 is tightened, the main body 71 of the heater block 7 is pushed up by the nut 42, and the heater block 7 moves to the upper end portion side of the main body 32 of the sample introduction portion 3. Then, an upper end surface of the main body 71 of the heater block 7 abuts against the contact portion 41 provided at the upper end portion (the first recess 35) of the sample introduction portion 3.

In this manner, the main body 71 of the heater block 7 is fixed to the main body 32 of the sample introduction portion 3 such that both end portions thereof are interposed between the contact portion 41 and the nut 42. A position of the heater block 7 (heater 8) with respect to the main body 32 of the sample introduction portion 3 at this time is the first mounting position.

The main body 32 of the sample introduction portion 3 to which the heater block 7 is attached is disposed in the insertion portion 12 in a state in which the axial direction thereof extends along the vertical direction. The upper end portion of the main body 32 of the sample introduction portion 3 is fixed to the mounting portion 33 attached to the mounting hole 11A of the top plate 11. The septum 34 is attached to the mounting portion 33 in a fixed state.

In this manner, the heater block 7 is fixed to the main body 32 of the sample introduction portion 3 by directly coming into contact with the contact portion 41 attached to the main body 32 of the sample introduction portion 3. Then, when the sample introduction portion 3 is fixed to the top plate 11, the position of the heater block 7 is fixed.

Then, in this state, heat of the heater 8 is transmitted to the sample introduction portion 3 via the heater block 7, thereby heating the sample introduction portion 3. Specifically, in the main body 32 of the sample introduction portion 3, the heater block 7 heats from the upper end portion to the lower end portion thereof.

4. Change of Relative Position of Sample Introduction Portion and Heater Block

In this gas chromatograph, it is possible to adjust a position (place) at which the main body 32 of the sample introduction portion 3 is heated by changing a position of the contact portion 41 as described below.

Figure 3:
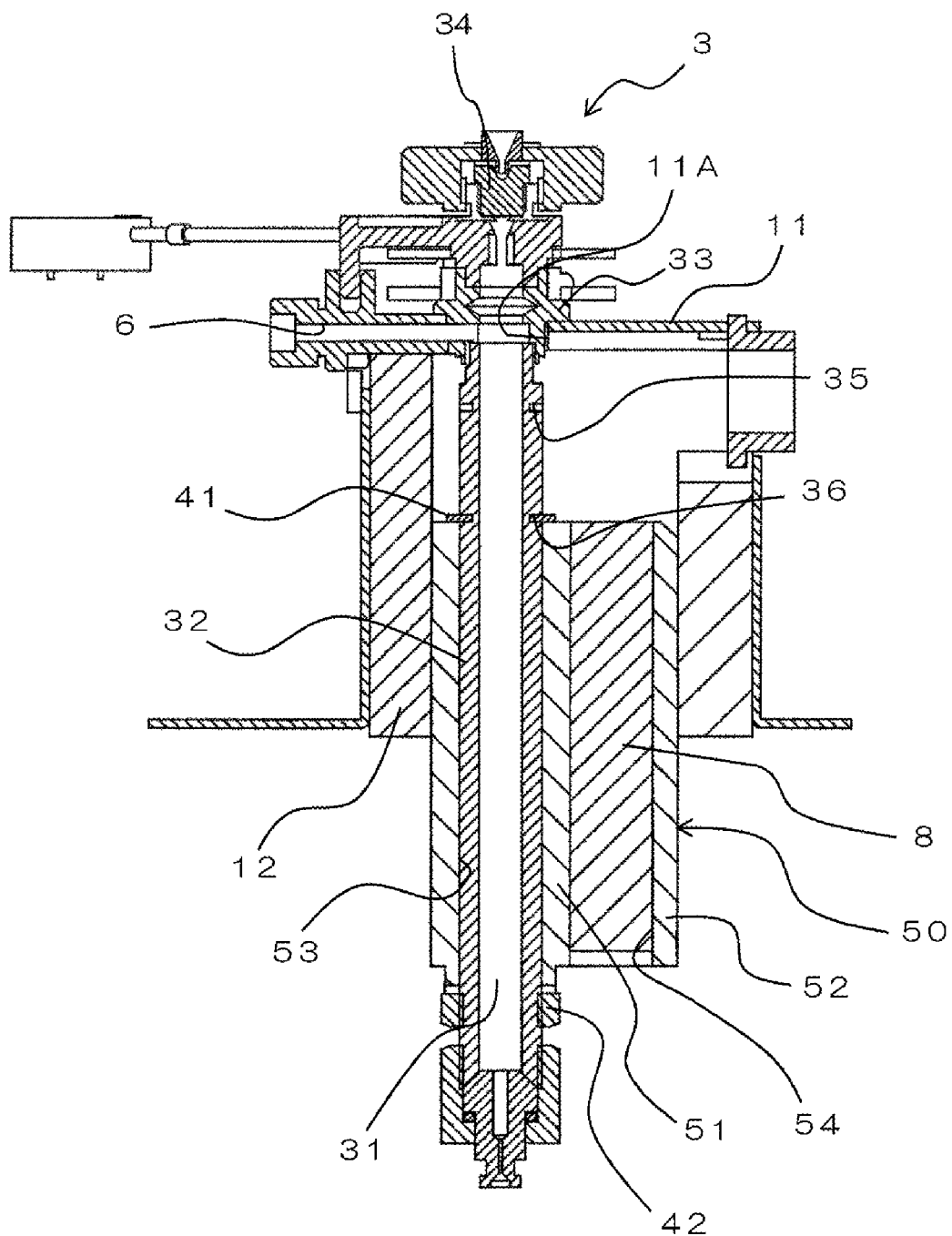
FIG. 3 is a side sectional view illustrating the sample introduction portion and a heater block of the gas chromatograph of FIG. 1, and illustrates a state in which the heater block is located at a second mounting position.
Figure 4:
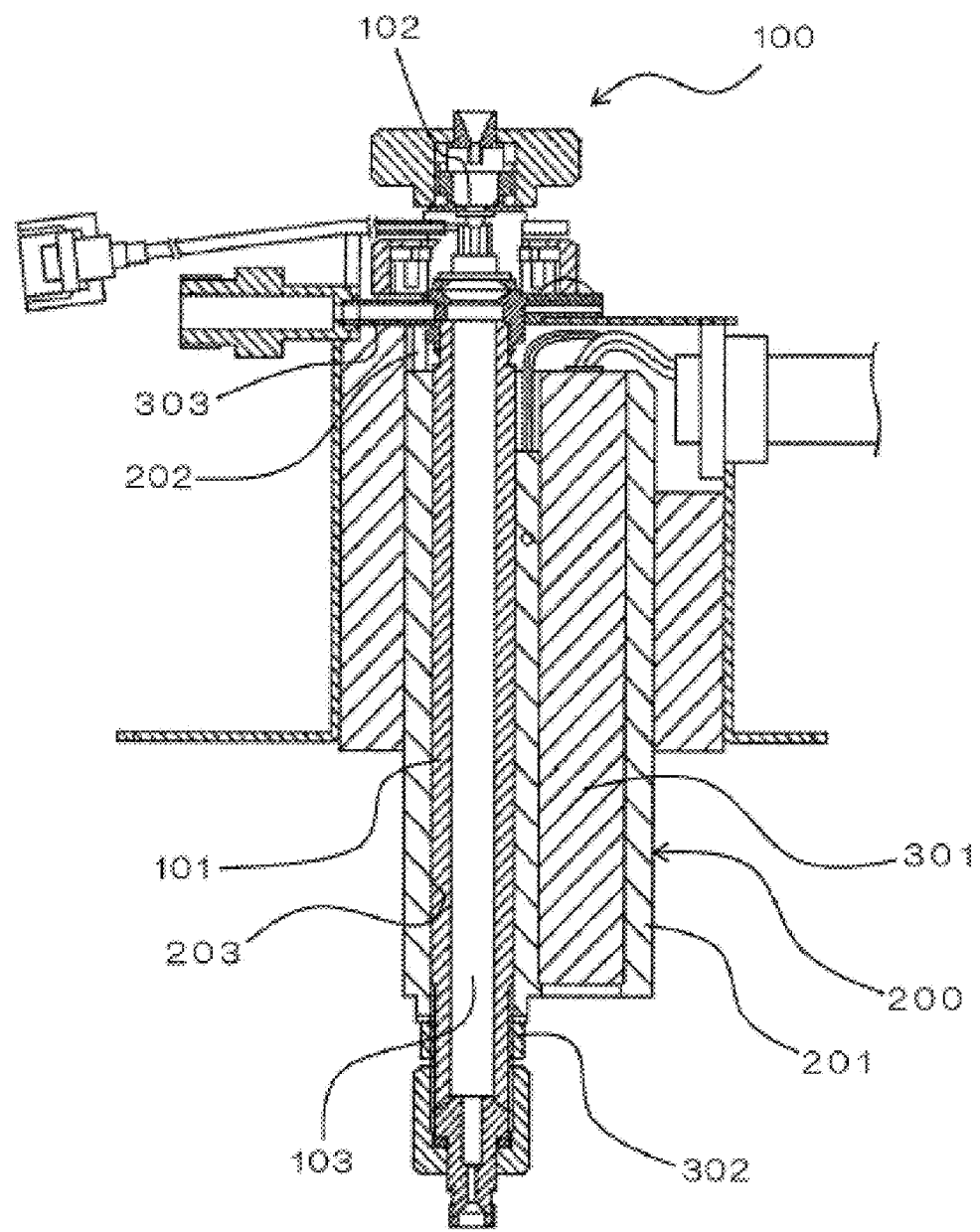
FIG. 4 is a side sectional view illustrating a sample introduction portion and a heater block included in a conventional gas chromatograph.

FIG. 3 is a side sectional view illustrating the sample introduction portion 3 and a heater block 50 of the gas chromatograph of FIG. 1, and illustrates a state in which the heater block 50 is located at a second mounting position.

For example, when it is desired to suppress heating around the septum 34, the contact portion 41 is fit into the second recess 36 and fixed to the main body 32 of the sample introduction portion 3 as illustrated in FIG. 3.

In this state, the inner edge of the contact portion 41 enters the second recess 36, and the outer edge of the contact portion 41 protrudes radially outward from the outer peripheral surface of the main body 32 of the sample introduction portion 3.

Then, similarly to fixing of the heater block 7 to the sample introduction portion 3, the heater block 50 is fixed to the sample introduction portion 3.

A shape of the heater block 50 is a shape obtained by reducing the dimension in the longitudinal direction (axial direction) in the heater block 7, and dimensions other than the dimension in the longitudinal direction are the same as those of the shape of the heater block 7. That is, a main body 51, a holding portion 52, an insertion space 53, and a holding space 54 of the heater block 50 correspond to the main body 71, the holding portion 72, the insertion space 73, and the holding space 74 of the heater block 7, respectively, as shown in FIG. 2. In addition, the heater 8 is disposed in the holding space 54 of the heater block 50.

That is, the main body 32 of the sample introduction portion 3 is inserted into the insertion space 53 of the main body 51 of the heater block 50. Then, the main body 32 of the sample introduction portion 3 is covered with the main body 51 of the heater block 50.

Subsequently, the nut 42 is attached to the lower end portion of the main body 32 of the sample introduction portion 3. In addition, when the nut 42 is tightened, the main body 51 of the heater block 50 is pushed up by the nut 42, and the heater block 50 moves to the upper end portion side of the main body 32 of the sample introduction portion 3. Then, an upper end surface of the main body 51 of the heater block 50 abuts against the contact portion 41 provided in the second recess 36 of the sample introduction portion 3.

In this manner, the main body 51 of the heater block 50 is fixed to the main body 32 of the sample introduction portion 3 such that both end portions thereof are interposed between the contact portion 41 and the nut 42. A position of the heater block 50 (heater 8) with respect to the main body 32 of the sample introduction portion 3 at this time is the second mounting position.

In this instance, a portion around the septum 34 in the main body 32 of the sample introduction portion 3 is not covered by the main body 51 of the heater block 50.

In addition, similarly to the above description, the main body 32 of the sample introduction portion 3 is fixed to the top plate 11.

In this state, heat from the heater 8 is transmitted to the sample introduction portion 3 via the heater block 50, thereby heating the sample introduction portion 3. Specifically, the main body 32 of the sample introduction portion 3 is heated by the heater block 50 except for a periphery of the septum 34.

5. Effects (1) In the present embodiment, as illustrated in FIG. 2, the heater block 7 is fixed to and positioned with respect to the main body 32 of the sample introduction portion 3 by directly coming into contact with the contact portion 41 attached to the main body 32 of the sample introduction portion 3.

For this reason, the heater block 7 may be securely positioned with respect to the sample introduction portion 3.

In addition, the heater block 7 may be positioned without providing a member such that heat from the heater block 7 is transferred to the outside and lost.

For this reason, it is possible to transfer heat from the heater block 7 to the sample introduction portion 3 without loss and efficiently heat the sample introduction portion 3.

(2) In addition, in the present embodiment, as illustrated in FIG. 2, the main body 71 of the heater block 7 is fixed to and positioned with respect to the sample introduction portion 3 such that the both end portions thereof are interposed between the contact portion 41 and the nut 42.

For this reason, it is possible to securely keep the position of the heater block 7 positioned with respect to the sample introduction portion 3 at a fixed position.

(3) In addition, in the present embodiment, as illustrated in FIG. 2 and FIG. 3, since a relative position of positioning of the heater blocks 7 and 50 with respect to the sample introduction portion 3 can be changed, a heated part of the sample introduction portion 3 can be changed.

For this reason, depending on the content of analysis in the gas chromatograph, it is possible to adjust the heated part of the sample introduction portion 3. For example, as illustrated in FIG. 2, when the main body 32 of the sample introduction portion 3 is heated from the upper end portion to the lower end portion by the heater block 7, it is possible to heat the periphery of the split flow path 6. Further, in this case, it is possible to suppress occurrence of carry-over in which a sample at previous analysis is collected in the split flow path 6. In addition, for example, as illustrated in FIG. 3, when a portion around the septum 34 in the main body 32 of the sample introduction portion 3 is not covered by the main body 51 of the heater block 50, it is possible to heat a part of the sample introduction portion 3 except for a periphery of the septum 34. Further, in this case, it is possible to suppress vaporization of the sample while the sample is injected into the sample vaporization chamber 31 through the septum 34, and to carry out analysis having high reproducibility.

(4) In addition, in the present embodiment, as illustrated in FIG. 2 and FIG. 3, the contact portion 41 is attachable to and detachable from either the first recess 35 or the second recess 36. Further, a relative position of positioning of the heater blocks 7 and 50 with respect to the sample introduction portion 3 is changed by bringing the heater blocks 7 and 50 into contact with the contact portion 41 in a state in which the contact portion 41 is attached to either the first recess 35 or the second recess 36.

For this reason, it is possible to change the relative position of positioning of the heater blocks 7 and 50 with respect to the sample introduction portion 3 by a simple operation of merely changing the mounting position of the contact portion 41.

6. Modifications

In the above description, the contact portion 41 is described as an E-ring. However, the contact portion 41 may be a member which is provided in the main body 32 of the sample introduction portion 3 and directly comes into contact with the heater block. For example, the contact portion 41 may include another ring member such as a C-ring. Further, for example, the contact portion 41 may be another member attached to protrude from the outer circumferential surface of the main body 32 of the sample introduction portion 3, such as a screw attached to the main body 32 of the sample introduction portion 3.

In addition, in the above description, two recesses of the first recess 35 and the second recess 36 are formed in the main body 32 of the sample introduction portion 3. However, three or more recesses to which the contact portion 41 is attached may be formed in the main body 32 of the sample introduction portion 3.

In addition, in the above description, one contact portion 41 is provided on the main body 32 of the sample introduction portion 3. However, a plurality of contact portions may be provided on the main body 32 of the sample introduction portion 3. Further, the relative position of positioning of the heater block with respect to the sample introduction portion 3 may be changed by brining the heater block into contact with any one of the plurality of contact portions. In this case, it is preferable that the projecting amount of each contact portion increases as the contact portion is disposed on the upper end portion side of the main body 32 of the sample introduction portion 3. According to such a configuration, it is possible to easily change the relative position of positioning of the heater block with respect to the sample introduction portion 3 by merely changing the contact portion with which the heater block is brought into contact.

In addition, in the above description, one heater block is fixed to the main body 32 of the sample introduction portion 3. An arbitrary number of heater blocks may be selected, and each of the heater blocks may be fixed to the main body 32 of the sample introduction portion 3.

In addition, in the above description, the recess is formed in the main body 32 of the sample introduction portion 3, and the contact portion 41 is fit into the recess. However, the main body 32 of the sample introduction portion 3 and the contact portion may be integrally formed.

The invention claimed is:

1. A gas chromatograph comprising:
   a sample introduction portion in which a sample vaporization chamber for vaporizing a sample is formed;
   a heater block that heats the sample introduction portion from an outside; and
   a positioning mechanism that positions the heater block with respect to the sample introduction portion by bringing the heater block into contact with a contact portion provided on the sample introduction portion,
   wherein the sample introduction portion contacts with the heater block along an axial direction, and
   the positioning mechanism positions the heater block with respect to the sample introduction portion while interposing both end portions of the heater block in the axial direction.

2. The gas chromatograph according to claim 1, wherein the heater block is a tubular member,
   the sample introduction portion is inserted into the heater block along an axial direction.

3. The gas chromatograph according to claim 1,
   wherein the contact portion is attachable to and detachable from a plurality of mounting positions, and
   the positioning mechanism is allowed to change the relative position of the heater block with respect to the sample introduction portion by bringing the heater block into contact with the contact portion attached to any one of the plurality of mounting positions.

* * * * *